H. HACKMAN, Jr.
SCREW-GEARING.
No. 190,679. Patented May 15, 1877.
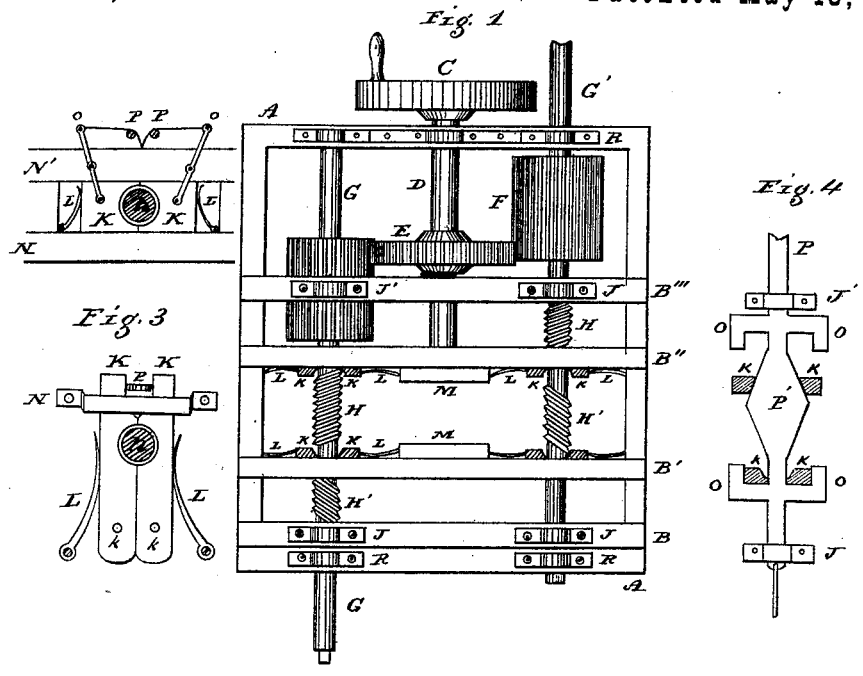
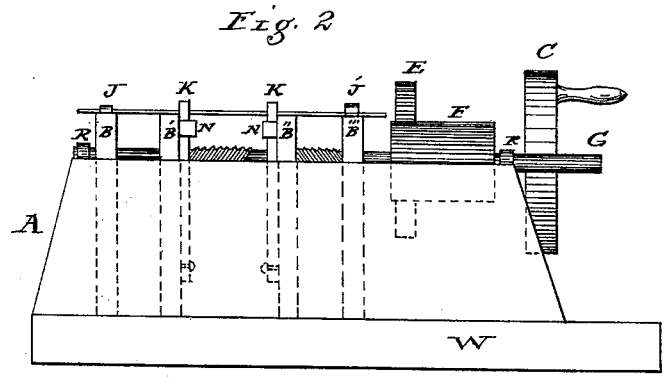
W. B. Wiley
Jacob Stauffer
Witnesses
Henry Hackman, Jr.
Inventor

UNITED STATES PATENT OFFICE.

HENRY HACKMAN, JR., OF PEQUEA TOWNSHIP, LANCASTER COUNTY, PA.

IMPROVEMENT IN SCREW-GEARINGS.

Specification forming part of Letters Patent No. 190,679, dated May 15, 1877; application filed March 16, 1877.

*To all whom it may concern:*

Be it known that I, HENRY HACKMAN, Jr., of Pequea township, Willow Street P. O., Lancaster county, and State of Pennsylvania, have invented certain Improvements in Mechanical Movements by Screw-Power, of which the following is a specification:

The nature of my invention consists in the arrangement of the gearing, in combination with one or two right and left handed screw-shafts and stationary nuts or concave screws, made in two parts, so that said screw shaft or shafts shall be made to traverse back and forth alternately a given distance without arresting or changing the rotary motion or the direction given to the wheel or pulley on the driving-shaft, as herein more fully set forth.

The accompanying drawing, with the letters of reference marked thereon, and a brief explanation, will enable those skilled in the art to make and use the same, in which—

Figure 1 is a plan or top view with the shifting device, Fig. 4, removed. Fig. 2 is a side elevation. Fig. 3 shows the open nuts; Fig. 4, one of the devices for opening and closing the nuts alternately.

The supporting frame-work A is supported on a base, w, Fig. 2, and divided into four compartments by the cross-partitions B, B', B'', and B'''. These are shown somewhat elevated. The driving-shaft D, with its wheel or pulley c has its bearing centrally in suitable boxes R on the front cross-piece A through B''', and the inner end of the shaft in box or bearing in B'' of the cross-divisions. Said shaft D carries a cogged wheel, E, as shown. The traversing-shafts G G' have each a long cogged cylinder or wheel, F, which engages with the driving-wheel E. The shafts G extend from front to rear of the frame A, and have their bearings or boxes R, through which they alternately pass back and forth, beyond said end pieces of the frame. Sufficient space is cut out of the cross-partition B''', to allow the long cogged wheels F to pass through into the second chamber. This traversing-shaft G is also provided with a right-handed screw, H, and a left-handed screw-thread, H', with an intervening blank space, and on each end of the several screws. The nuts or concave screw-plates K are made in two parts, meeting centrally, embracing the screw on the shaft. Springs L are shown to bear against them, to restore them when not acted upon by the opening device P or O. I show a pair of plates, K, made to slide apart in keepers N, above and beneath them, actuated by levers o, or their equivalent. I also show the long nuts or plates K, held in a keeper, N, above, and moved on the pivots k below, sufficiently apart above to clear the concave thread from contact with the convex screw on the shaft, by means of the shifting device, Fig. 4, which slides back and forth in the keepers J. (Shown on top of the cross-partitions B and B'''.) This shifting device P has a double wedge, P', centrally, and right-angled arms o, for the purpose of alternately separating the nuts K by wedging them apart, and embracing them when the nuts are closed by automatic connection with the action of the screw-shaft, to shift the nuts just at the proper points, so as to engage alternately with the right-hand screw and left-hand screw.

To accomplish this, several mechanical devices are suggested, according to the purpose the motion may be applied to.

I, therefore, do not confine myself to any special arrangement of the nut-opener or shifting device, nor to the special application of this screw-power; but to combine it with other machinery in which a reciprocating screw-motion may be employed when constructed substantially so far as herein shown and described as my invention.

The power of the screw is well known.

I am aware, also, that right and left handed screw shafts are not new for a right and left motion; but I am not aware of a screw-shaft or a pair of screw-shafts, constructed and combined as shown and described, with the nuts alternately opening and closing, to engage with the right-hand thread, moving the shaft in one direction. then shifting out and engaging the other nut with the left-handed thread, to operate the shaft in the opposite direction, by means of a long traversing cog-wheel on said shaft, while the driving-gear is rotated, without change or intermission, in one direction.

This arrangement I believe to be novel, and applicable to various mechanical purposes, and embraces all I seek to secure as my invention. Therefore,

What I claim as novel is—

The combination of a driving-wheel, E, moved by the power applied in a continuous direction, and imparting motion to the long or traversing cogged wheel F, supported on the right and left handed screw shaft G, the divided nuts K, opened and closed to reverse and give the alternate motion back and forth of the shaft, by means of a shifting device, P, substantially arranged and operating as and for the purpose specified.

HENRY HACKMAN, JR.

Witnesses:
WM. B. WILEY,
JACOB STOUFFER.